Aug. 22, 1967

B. L. SNAVELY 3,336,832

OPTICAL SYSTEM FOR MEASURING TWIST

Filed Aug. 9, 1962

INVENTOR
BENJAMIN L. SNAVELY

BY

ATTORNEYS

Aug. 22, 1967 B. L. SNAVELY 3,336,832
OPTICAL SYSTEM FOR MEASURING TWIST
Filed Aug. 9, 1962 2 Sheets-Sheet 2

INVENTOR.
BENJAMIN L. SNAVELY
BY
ATTORNEYS

United States Patent Office 3,336,832
Patented Aug. 22, 1967

3,336,832
OPTICAL SYSTEM FOR MEASURING TWIST
Benjamin L. Snavely, Silver Spring, Md., assignor to the United States of America as represented by the Secretary of the Navy
Filed Aug. 9, 1962, Ser. No. 216,003
9 Claims. (Cl. 88—14)

The invention described herein may be manufactured and used by or for the Government of the United States of America for governmental purposes without the payment of any royalties thereon or therefor.

This invention relates to an optical system for measuring twist and more particularly to a system for accurately measuring the degree of twist or rotation of a first object about an optical path extending therefrom to a second object with respect to which the twist is measured.

In connection with the alignment of missile guidance systems and the measurement of angular deflections of large structures, it has been found desirable or necessary to measure the degree of misalignment or the angular deflections of such structures at a pair of remotely spaced points thereon such, for example, as the degree of weave or twist at the end portions of a large vessel such as might occur as the result of wind or waves as the vessel moves along a course.

Various devices heretofore have been proposed for effecting such measurements, one of which employs a beam of polarized light from a light source such an incandescent lamp passing through a lens and a polarizer such as a Nicol prism located at a first point of reference, the polarized light then passing through another Nicol prism or similar device at the second point of reference from whence the light beam is focused by a lens onto a photocell having a milliammeter connected to the output thereof as a signal indication of the degree of twist of one point of reference with respect to the other reference point. The Nicol prisms are initially adjusted about an axis approximately coincident with the line of sight until the current through the milliammeter is a minimum. Under this condition the respective planes of polarization of the two crystals or prisms are at right angles.

The sensitivity of such a device has been increased by a slight oscillatory rotation of either of the prisms about an axis approximately coincident with the line of sight in such manner that the oscillations are centered about the null position of the prism. In order to avoid the difficult mechanical problem of oscillating the prism, an optical cell commonly known as a Faraday cell has been placed between the two polarizing prisms in another form of the prior art device. This cell is filled with a transparent fluid such as carbon disulfide or bromobenzene which rotates the plane of polarization of the light passing through the cell when a magnetic field is applied to the fluid by a coil of wire encircling the cell and energized by a source of alternating current to produce a periodically varying or alternating magnetic field within the fluid. In this system the alternating component of the photocell output is amplified by a suitable amplifier and passed into a synchronous rectifier which in turn drives the milliammeter.

The disadvantages of this system are:
(a) The degree of optical rotation that can be produced by the Faraday cell is quite limited thereby limiting the sensitivity and restricting the range of angular displacement over which the system will operate.
(b) The stray magnetic field from the Faraday cell may adversely affect the operation of the photocell unless special precautions are taken to prevent this.
(c) Slight irregularities and strains in the walls of the Faradey cell change the polarization of the light beam in such manner that it cannot be completely stopped for any position of the second prism.
(d) Fluids which are employed in the Faraday cell are inflammable and toxic whereby the use of a device containing these fluids in a closed space, such as aboard a ship, may be hazardous.

The system of the present invention possesses all of the advantages of the prior art devices and none of the foregoing disadvantages. In accordance with the teaching of the present invention this desirable result is achieved by the use of a pair of crystals or prisms each having light polarizing characteristics and placed side by side in such manner that the plane of polarization of the light passing through one prism is at a slight angle with respect to the plane of polarization of the light passing through the other prism. The light beams of these prisms are reflected by an oscillating mirror onto a photocell which is connected to a phase sensitive detector having an electrical connection from the source of electrical current driving the mirror whereby the phase relationship between the output of the photocell and the current through the coil driving the mirror is employed to operate a milliammeter connected to a phase sensitive detector as an indication of the direction and magnitude of twist between the two points of reference, as will more clearly appear as the description proceeds.

One of the objects of the present invention is to provide a new and improved optical system for measuring the direction and degree of twist between two stations.

Another of the objects is to provide an optical system for the measurement of the direction and degree of twist between two stations in which errors in the measurement are compensated.

Still another object is to provide a new and improved optical system for measuring a direction and degree of twist between the two stations in which means are provided for focusing and reflecting a pair of polarized beams of light of different intensities when a twist condition exists in such manner that the reflected beams traverse a photoelectric cell periodically thereby causing a change in the output of the photoelectric cell in proportion to the degree of twist to be measured.

Still other objects, advantages and improvements will be apparent from the following description taken in connection with the accompanying drawings of which:

Figure 1:
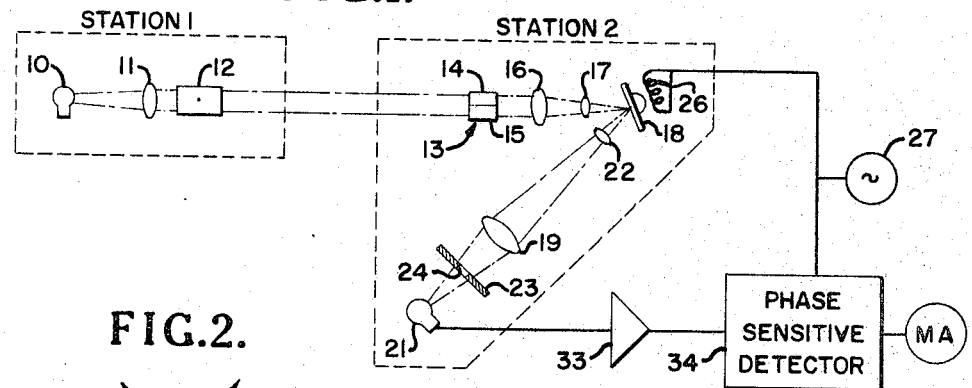
FIG. 1 illustrates a complete twist measuring system according to a preferred embodiment of the invention.

Referring now to the drawings on which like numerals of reference are employed to designate like parts throughout the several views and more particularly to FIG. 1 thereof, there is shown thereon a complete system according to a preferred form of the invention comprising apparatus for transmitting a polarized beam of light from station 1 and apparatus at station 2 for receving the polarized beam and reflecting it variably upon a photocell in a manner to control the setting of a milliammeter in accordance with the degree of twist between the two stations. The apparatus at FIG. 1 comprises a source of light such as the incandescent lamp 10 illustrated, the light from which is passed through a lens 11 and thereafter through a polarizer 12, such, as for example, as a Nicol prism all located in predetermined fixed spatial relation at station 1. The polarized light from prism 12 passes through a pair of prisms indicated generally at 13 and located at station 2, the pair of prisms comprising two prism elements 14 and 15 placed side by side in such manner that the plane of polarization of the light passing through one of these prisms is at a slight angle with respect to the plane of polarization of the light passing through the other prism. The light passing through the pair of prisms passes through a lens 16 and lens 17 in the order named to a focal point on the surface of a small rotatable mirror 18. Light reflected from the mirror is focused by lens 19 on a photocell 21. A lens 22 is disposed within the path of the beam of light reflected from the mirror 18 intermediate the mirror and the lens 19 which, acting in combination with lens 17, forms an image of the face of the prism pair 13 in the plane of diaphragm 23 having an aperture 24 therein less in size than the size of the reflected image of the prism pair. The size of the reflected image is indicated by the dashed outline 25 in FIGS. 3A, 3B and 3C of the drawings. The mirror 18 is pivotally supported for oscillation about an axis, preferably in a manner similar to the mirror of a galvanometer, about an axis perpendicular to a plane determined by the axis of the light beams incident and reflected from the mirror. The plane separating the two prisms of the prism pair 13 is parallel to the axis of rotation of the mirror 18. The mirror 18 is maintained in oscillation through a small angle about its axis of rotation by the electromagnetic action of a coil 26 on either a soft iron armature mounted on the rotating element carrying the mirror or on a permanent magnet although other means may be employed, if desired, for causing the mirror to oscillate or vibrate in response to an alternating current applied to the actuating element thereof. The particular structure for producing the oscillation of the mirror is not shown for the reason that methods of accomplishing such oscillation are well known to persons skilled in the art. The coil 26 is excited by electrical current received from an alternating current source designated at 27 whereby the mirror oscillates at the frequency of this current from the source.

Figure 2:
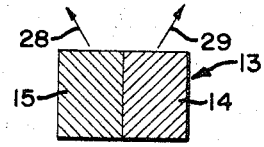
FIG. 2 is a view somewhat enlarged of the pair of light receiving crystals at station 2.
Figure 3:
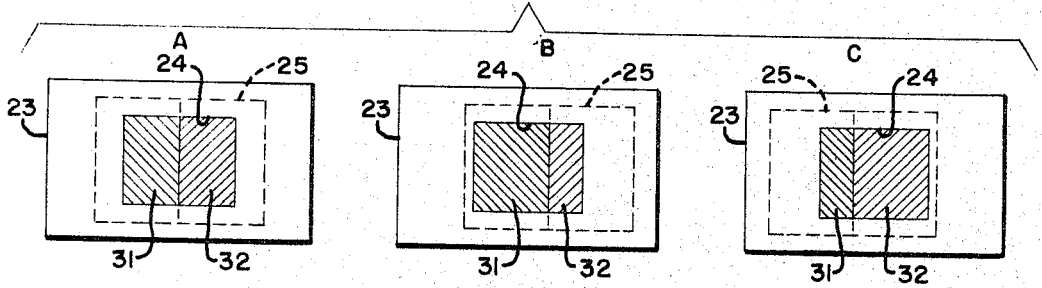
FIGS. 3a, 3b and 3c are views of the reflected image of the crystals of FIG. 2 focused on the diaphragm of FIG. 1 when the reflecting mirror is in its center position and when the mirror is rotated clockwise and counterclockwise respectively therefrom.

The construction of the prism pair 13 will best be understood by reference to FIG. 2 which is a view of the prisms taken along the axis of the optical path. Prism 15 polarizes light passing through it such that the plane of polarization is in a direction indicated by arrow 28 and prism 14 polarizing the light passing through it such that its plane of polarization will be as shown by the arrow 29. The planes of polarization indicated at 28 and 29 make equal angles with the plane separating the prisms and lie on opposite sides thereof. Referring now specifically to FIGS. 3A, 3B and 3C on which are shown the relative positions of the images 25 of the prisms 14 and 15 formed by the lenses 17 and 22 respectively when the mirror is in its center position as shown on FIG. 3A, the corresponding relationship between the diaphgram opening 24 and the image position when the mirror 18 is rotated clockwise and counterclockwise from its center position being shown on FIGS. 3B and 3C.

If the incident light on prism 13 is of uniform intensity and has a direction of polarization which is either parallel or perpendicular to the plane separating the two prisms, the amount of light transmitted by the two prisms will be equal and the images 31 and 32 will be equally bright. When this condition exists the pair of images move back and forth across the diaphragm 23 in accordance with the oscillatory motion of the mirror and the amount of light passing through the aperture 24 of the diaphragm and filling on the photocell 21 will be invariant. If, however, the polarization of the incident light on the prism pair 13 is such that more light is transmitted by one of the prisms of the pair than by the other, the images 31 and 32 will differ in brightness and the total light flux passing through the aperture 24 will depend upon the position of the mirror 18. Since the mirror oscillates periodically the light passing through the diaphragm and falling on the photocell 21 will vary periodically when this condition exists and this will cause a corresponding periodic variation in the output of the photocell. The output of the photocell is amplified by the amplifier 33, the output of which is connected to a phase sensitive detector 34, the operation of which is well known in the art. The phase detector is supplied with an alternating current from the source 27 whereby a phase comparison is made between this current and the amplified current output of the photocell 21. The output of the phase sensitive detector 34 is made manifest on a sensitive electrical indicating instrument connected thereto such, for example, as the milliammeter illustrated and designated MA.

The phase relationship between the output of the photocell and the current through coil 26 driving the mirror 18 will depend upon which of the prisms 14 or 15 transmits the greater amount of light. The phase sensitive detector 34 has an output which is proportional to the amplitude of the periodic signal received from the photocell through the amplifier 33 and the sense of the output from the amplifier 33 is dependent upon the phase of the signal from the photocell.

The phase sensitive detector 34 is adjusted such that the milliammeter MA will have an average reading of zero when equal amounts of light pass through the prisms 14 and 15. Under this condition of average reading of zero, the direction of polarization produced by prism 12 at station 1 makes equal angles with the directions defined by prisms 14 and 15. If the assembly at station 1 consisting of the lamp 10, the lens 11 and the prism 12 is rotated about the axis joining the first and second prism points by a small angle, the amount of light passing through the two prisms 14 and 15 at station 2 will no longer be equal and the average current through the milliammeter MA will be positive or negative in accordance with the direction of the angular displacement.

The equipment comprising the lamp 10, lens 11 and polarizing prism 12 at station 1 is mounted in a rigid assembly which would accurately maintain the required spatial relationship of these parts. The optical parts at the receiving station 2 comprising the prism pair 13, the lenses 16 and 17, the oscillating mirror 18 with its driving coil 26, the lenses 22 and 19, the diaphgram 23 and the photocell 21 would also be assembled into a rigid structure maintaining the necessary spatial relationships therebetween.

The optical axis of station 1 would be defined as a line through lamp 10 and the center of lens 11 whereas the optical axis of station 2 would be a line through the centers of the lenses 16–17 and the oscillating mirror 18. For maximum precision the optical axes of the two stations must be parallel to each other. This condition of mutual parallelism may be obtained by adjusting the stations 1 and 2 such that the image of the lamp 10 falls on the center of the mirror 18, the brightness of the image being greatly enhanced by removal of the prism pair 14–15 while the station adjustment is being made. When the axes of the two stations are substantially collinear and the stations are adjusted to parallelism, the prisms 14 and 15 will be equally illuminated by the polarized light received from station 1. This equality of illumination is required for optimum performance of the system.

The assembly at each of the stations preferably is provided with means for establishing a direction which is perpendicular to the respective optical axis and which bears a fixed angular position relative to the direction of polarization established by the respective prism or prism assembly, as the case may be. This arrangement may comprise a pair of plane mirrors rigidly assembled into each station respectively, each mirror having its reflecting surface parallel to the respective optical axis, for establishing these directions. The directions determined by this or other suitable means is referred to herein as fiducial directions. The angular relationship between the fiducial directions may be established over short distances by conventional means. For best results the optical system at station 2 should preferably be shielded from extraneous stray or scattered light. As the two assemblies are separated, the fiducial directional relationship established at short distances can be reestablished at any other distance within optical sight by rotating one of the assemblies about the line of sight as an axis until a no reading on the milliammeter is again obtained. Whereas a no reading will be obtained in each 90° interval, the resulting ambiguities will generally not be such as would result in any confusion.

Figure 4:
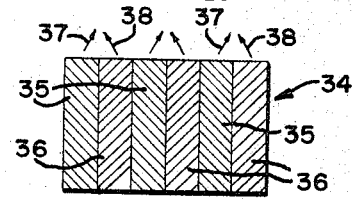
FIG. 4 is a view of the polarized light receiving element of station 2 according to an alternative form of the invention.

On FIG. 4 is shown an alternative arrangement of crystals or prisms suitable for use at the light receiving station 2 of FIG. 1 in lieu of the single pair of crystals 14–15 comprising the crystal or prism element 13. In the arrangement of FIG. 4 the prism element designated generally by the numeral 34 comprises three pairs of prism elements 35–36, the crystals of each pair being in back-to-back relation with the planes of polarization thereof respectively indicated by the arrows 37–38, and having an angle therebetween of the order of .1° to 10.0°. The light incident on the prism pairs should be polarized approximately at a right angle to these directions.

Figure 5:
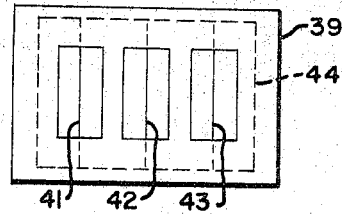
FIG. 5 is an apertured diaphragm suitable for use with the crystal element of FIG. 4.

On FIG. 5 is shown a diaphragm 39 suitable for use with the crystal elements of FIG. 4 and disposed in the same relative position, when in use, in the space occupied by diaphragm 23 of FIG. 1. The diaphragm has three apertures 41, 42 and 43, the first aperture 41 being associated with the first pair of crystals 35–36, the second aperture 42 being associated with the second or central pair of crystals 35–36 and the remaining aperture being associated with the remaining pair of crystals 35–36. The image of the crystal element 34 is indicated on FIG. 5 by the numeral 44 and the images of the three pair of crystals are visible therethrough as illustrated when the mirror 18 is in the central position.

Figure 6:
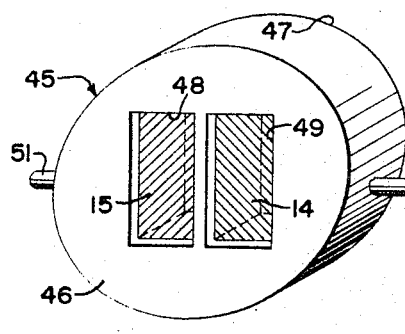
FIG. 6 is a view in perspective of the mounting means for the pair of light receiving crystals at station 2 according to a preferred form thereof.

Referring now to the FIG. 6 of the drawings there is shown thereon a mounting plate 45 preferably a circular configuation and having a front surface 46 and a rear surface 47 parallel thereto, the rear surface being preferably machined to a high degree of flatness, both surfaces being planar, as shown. There is also provided within the plate a pair of rectangular apertures 48 and 49 within which are disposed the crystals 15 and 14 respectively, the crystals being secured within the apertures in such manner that their planes of polarization make equal angles with the plane separating the prisms and lie on opposite sides thereof as indicated on FIG. 2. A pair of pins 51–52 are diametrically disposed on portions of the plate 45 in mutual aligned relation and midway between the surfaces 46 and 47 in such manner that the axis of the pins bisects the apertures 48 and 49 substantially as shown. The pins are cylindrical and positioned with respect to the plate with a high degree of precision whereby the polarized crystals or prisms 48 and 49 will be exactly transposed when the plate is rotated from the position of FIG. 9 to the position of FIG. 10.

Figure 7:
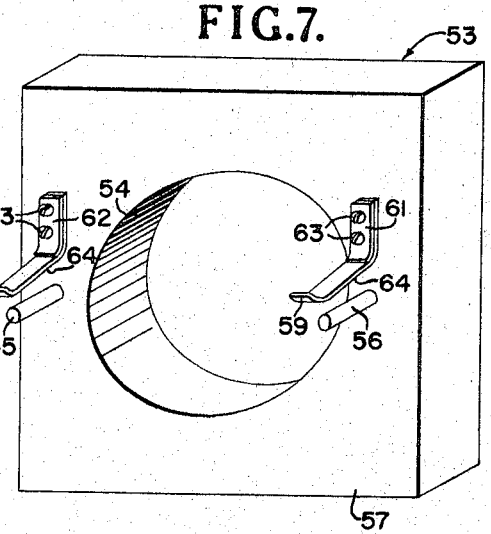
FIG. 7 is a view in perspective of the support for the mounting means of FIG. 6.

On FIG. 7 is shown a support or block 53 having a circular aperture 54 therein of less diameter than the diameter of the circular plate 45 but sufficiently large as not to interfere with the light passing through the apertures 48–49 of the mounting plate when the mounting plate is supported thereby. A pair of pins 55–56 are secured to the block 53 on opposite sides of the aperture 54 and mutually spaced just sufficient to allow free sliding movement of the mounting plate 45 therebetween when the pins are engaged by the pins of the block. The front surface 57 of the block is machined to a flat planar surface with a high degree of precision for engagement with the surface 47 of the mounting plate 45 when the mounting plate is supported by the block in either the initial position or the 180 degree rotated position, as the case may be. The pins 55–56, it will be understood, are preferably normal to the surface 57.

A pair of spring clips 58 and 59 preferably having a pair of reinforcing leaves 61 and 62 are secured by the screws 63 to the block 53 in such manner that the clips press against the pins 51–52 of the mounting plate when the mounting plate is supported by the pins 55–56 of block 53. The clips 58–59 have an inclined surface 64 formed thereon in such manner to maintain the mounting plate 45 securely in the assembled position with the surface 47 thereof in continuous engagement with the front surface 57 of the supporting block 53.

Figure 9:
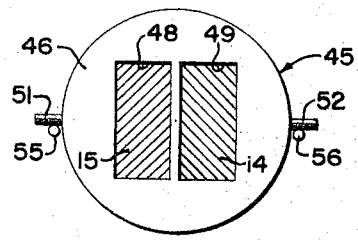
FIGS. 9 and 10 are diagrammatic views illustrating the light receiving crystals mounting element in an initial position and in the reversed position respectively with respect to the support of FIG. 7.
Figure 8:
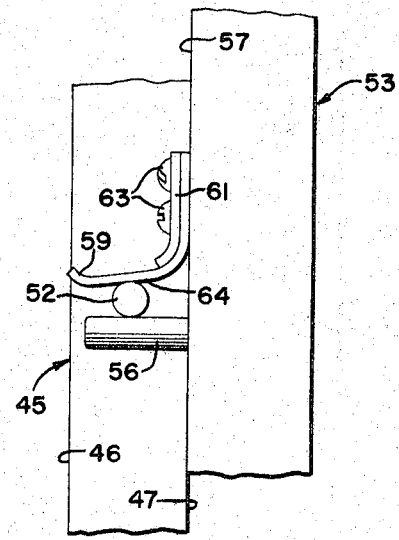
FIG. 8 is a fragmentary view somewhat enlarged of the assembly of the mounting means for the pair of receiving crystals with the support of FIG 7.
Figure 10:
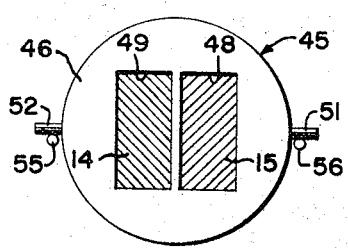

An arrangement has thus been provided in which the crystals are maintained in an initial predetermined fixed position when supported by block 53 as indicated diagrammatically on FIG. 9 and subsequently are maintained in a precisely reversed position as indicated schematically on FIG. 10, the reversal of crystal positions being achieved by removal of the crystal mounting plate 45 from the block or support 53, rotating the plate about its axis until the position of pins 51–52 thereof has been reversed and thereafter replacing the crystal mounting plate in the assembled position on block 53. By reversing the positions of the pair of crystals in the manner herein disclosed errors due to inequality of illumination of the crystals may be detected and measured.

Figure 11:
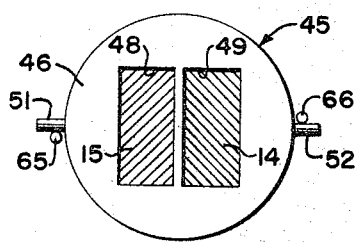
FIG. 11 is a diagrammatic view of the light receiving crystal mounting element positioned against the support element according to an alternative form of the invention.

A somewhat different arrangement of pins on block 53 is illustrated diagrammatically on FIG. 11 with which arrangement pin 65 occupies the same position as pin 55. Pin 66, however, is positioned oppositely to pin 56 with respect to the corresponding pin 52 on mounting plate 45 and the spring clip associated therewith, it will be understood, is so arranged as to urge pin 52 into engagement with pin 66 when the crystal supporting plate 45 is in the assembled position with respect to the support 53. This arrangement also provides means for supporting the crystals in exact mutually reversed positions, it being merely necessary to remove the crystal mounting plate 45 from the support 53 and turn it about its axis 180 degrees and thereafter replace the mounting plate on the support 53 with pin 52 thereof engaging pin 65 and pin 51 engaging pin 66.

Figure 12:
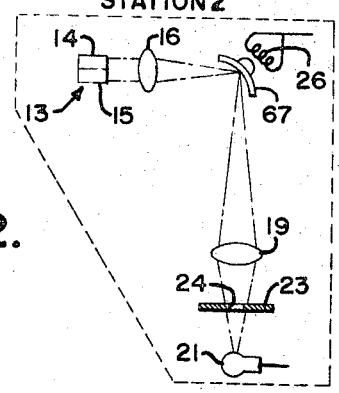
FIG. 12 is a diagrammatic view of an optical system at the receiving station according to an alternative form thereof.

On FIG. 12 is shown an alternative optical system for receiving the polarized light from station 1 and focusing an image of the prism pair at station 2 on the diaphragm 23. In this arrangement lenses 17 and 22 are not required and the vibrating or oscillating mirror 18 is replaced by an oscillating mirror 67 having the reflecting surface thereof configured in such manner as to form an image of the prism pair on the diaphragm.

Whereas the invention has been described with reference to a single pair of crystals or there pairs of crystals at the receiving station, as the case may be, it will be understood that a greater or lesser number of crystals may be employed, it being merely necessary that the diaphragm to be used therewith is provided with suitable openings therein for masking a portion of the crystal image during each oscillation of the mirror 18. The system of the present invention is also susceptible of use with a single prism at the receiving station and a pattern of retardation plates oriented in such manner that for one direction of polarization of the incident light the image of the prism will be uniformly illuminated and for angles on either side of this the illumination will be nonuniform.

Furthermore, if desired, the lamp 10 and photocell 21 may be interchanged in accordance with the well known Reciprocity Principle applicable to systems of this character, it being merely necessary to relocate the phase sensitive detector 34 and associated equipment connected thereto including the milliammeter MA at station 1 and establish an electrical connection between the stations for continuously maintaining the oscillating mirror in synchronous relation with the detector.

Whereas the invention has been described with particular reference to two examples thereof which give satisfactory results, it is not so limited as it will be apparent to one skilled in the art, after understanding the invention, that various changes and modifications may be made without departing from the spirit and scope of the invention and it is intended, therefore, in the appended claims to cover all such changes and modifications.

What is claimed as new and desired to be secured by Letters Patent of the United States is:

1. An optical system for measuring the degree of twist caused by an angular rotation about an axis between two stations on a structure, which comprises a source of polarized light at a first of said stations on the structure, a pair of polarizing prisms arranged side by side at the second of said stations on the structure in a manner to receive the polarized light from said source, said pair of prisms being so constructed and arranged that the plane of polarization of the light passing through one prism of the pair is at a slight angle with respect to the plane of polarization of the light passing through the other prism of the pair, the plane of polarization of the source of polarized light being substantially normal to the bisector of said slight angle when a condition of no twist exists therebetween, a small movable mirror, means for focusing an image of the light source on said mirror, means for oscillating the mirror about an axis perpendicular to a plane controlled by the axes of the light beams incident on and reflected therefrom and parallel to the plane separating the two prisms of said pair, a diaphragm having an aperture therein through which a selected portion of the rays reflected from the mirror pass, a photocell, means for focusing the reflected rays through said aperture onto said photocell in such manner that an image of the faces of said pair of prisms is in the plane of said diaphragm, the brightness of the image of each of said prisms of the pair being in accordance with the degree of light transmitted thereby and the total light flux passing through said aperture being in accordance with the instant position of the mirror, means for amplifying the output of the photocell, a phase sensitive detector connected to the amplifying means and to said oscillating means, the output of the amplifying means being proportional to the amplitude and phase of the signal from the photocell, and a milliammeter connected to the output of the phase detector and operated from a null position in either direction selectively in accordance with the phase of said signals correlative with the different intensities of rays of light passing through the two prisms of the pair thereby to give a signal indication of the direction and degree of axial twist of said pair of polarized prisms with respect to said source of polarized light.

2. A system according to claim 1 in which the slight angle between the planes of polarization of the light passing through said pair of prisms is within the range of .1° to 10.0°.

3. The system of claim 2 including means for supporting the pair of prisms in a position such that the planes of polarization thereof are substantially along a line with the direction of the polarized light beam from said source.

4. A system according to claim 3 in which the prisms supporting means includes means for detachably supporting the pair of prisms for rotative movement through an angle of 180° about the line of sight with respect to said source of polarized light and retaining the pair of prisms in the rotated position.

5. In a system for measuring relative angular rotation about an axis extending between two stations, a polarized light beam source positioned at one station, polarizing prism means at the other station having areas of diverse angles of polarization for receiving polarized light from said source and normally passing a beam of polarized light therethrough of uniform intensity throughout its cross-section when the stations are in a predetermined relative angular position and for passing a beam of polarized light of non-uniform intensity throughout its cross-section when the stations are displaced from their predetermined relative positions, a light baffle having an aperture therein of smaller cross-section than said beam, a mirror positioned in the path of said beam between the polarizing prism means and said baffle to reflect the beam onto the aperture of the baffle, means connected to the mirror for rotatively oscillating the mirror to cause the reflected beam to scan across the aperture of said baffle, photoelectric means for receiving light passing through the aperture, and indicating means coupled to said photoelectric means and to the mirror for comparing the phase of the output from the photoelectric means with the oscillating movement of the mirror as a function of the degree and direction of the relative angular rotation between said stations.

6. A system according to claim 5 wherein the polarized prism means comprises a pair of Nicol prisms in mutual abutting relation having their planes of polarization at a divergent angle of .1° to 10.0° with respect to each other and so arranged that the angle is bisected by the plane separating the prisms.

7. A system according to claim 5 in which the polarized prism means comprises three pairs of polarizing prisms in closely stacked relation, the prisms of each pair having their planes of polarization at a divergent angle of .1° to 10.0° with respect to each other and so arranged that the planes of alternate prisms are mutually parallel and the angle between the prisms of each pair of prisms is bisected by the axis of the optical path, and wherein said light baffle member is provided with two additional apertures, each of said apertures conforming generally to the cross-sectional configuration of a pair of polarizing prisms and so positioned as to be in alignment with the respective images thereof when the mirror is in the midposition during a cycle of oscillations.

8. A system according to claim 5 wherein the indicating means comprises a signal amplifier connected to the photocell and a phase sensitive detector connected to said signal amplifier and to the source of alternating current, and an electroresponsive device connected to the output of said detector and controlled thereby for indicating both the degree and direction of twist between the stations.

9. An optical system for measuring the rotational twist about an axis common to two stations comprising a polarized light source at the first of said stations for generating a beam of polarized light, polarizing means at the second of said stations for receiving said beam of polarized light and passing said beam therethrough, said polarizing means having a plane of symmetry parallel to the plane of polarization of said beam, said polarizing means being divided into at least two portions about said plane of symmetry, a first and a second of said portions having planes of polarization which diverge at a small angle from the plane of symmetry and diverge from said plane of symmetry and diverge from each other such that equal proportions of said beam are passed through said first and second portions when said first and second stations are in a predetermined oriented position and unequal proportions of said beam are passed through said first and second portions respectively when a rotational twist about said axis has occurred between said first and second stations, and light sensitive indicating means for receiving the light passed through the polarizing means whereby the magnitude and direction of the rotational twist between said first and second stations may be indicated.

References Cited

UNITED STATES PATENTS

| | | | |
|---|---|---|---|
| 2,412,074 | 12/1946 | Benford | 88—14 |
| 2,427,259 | 9/1947 | Chubb | 88—65 |
| 2,651,771 | 9/1953 | Palmer. | |
| 2,903,598 | 9/1959 | Hoover. | |
| 3,041,921 | 7/1962 | Pickels et al. | 88—14 |

JEWELL H. PEDERSEN, *Primary Examiner.*

A. A. KASHINSKI, T. L. HUDSON,
*Assistant Examiners.*